United States Patent
Mannesson et al.

(10) Patent No.: US 12,411,225 B2
(45) Date of Patent: Sep. 9, 2025

(54) SYSTEMS AND METHOD FOR ADAPTIVE RADAR FRAME FILTERING

(71) Applicant: Axis AB, Lund (SE)

(72) Inventors: Anders Mannesson, Lund (SE); Mattias Simonsson, Lund (SE); Santhosh Nadig, Lund (SE); Johan E Åkesson, Lund (SE); Sebastian Heunisch, Lund (SE); Anders Skoog, Lund (SE)

(73) Assignee: AXIS AB, Lund (SE)

( * ) Notice: Subject to any disclaimer, the term of this patent is extended or adjusted under 35 U.S.C. 154(b) by 217 days.

(21) Appl. No.: 18/483,122

(22) Filed: Oct. 9, 2023

(65) Prior Publication Data

US 2024/0134031 A1 Apr. 25, 2024
US 2024/0230878 A9 Jul. 11, 2024

(30) Foreign Application Priority Data

Oct. 19, 2022 (EP) .................................... 22202515

(51) Int. Cl.
*G01S 13/538* (2006.01)

(52) U.S. Cl.
CPC .................. *G01S 13/538* (2013.01)

(58) Field of Classification Search
CPC ............. G01S 13/5242; G01S 13/5244; G01S 13/524; G01S 13/538; G01S 7/415;
(Continued)

(56) References Cited

U.S. PATENT DOCUMENTS 6,970,128 B1 * 11/2005 Dwelly ................. G01S 13/888
342/25 R
11,119,186 B2 * 9/2021 Roh ........................ G01S 13/42
(Continued)

FOREIGN PATENT DOCUMENTS

CN 108828545 A 11/2018

OTHER PUBLICATIONS

Harter, M. "Vibrations in automotive radar systems", Paper, MTT-S International Conference on Microwaves for Intelligent Mobility (ICMIM), Germany (2016).
(Continued)

*Primary Examiner* — Peter M Bythrow
(74) *Attorney, Agent, or Firm* — Volpe Koenig (57) ABSTRACT

A system adaptively filters out a representation of an object from a radar frame captured by a radar device, where a maximum signal strength at zero velocity is obtained in a range bin comprising a detection of the object in range Doppler representations of a set of radar frames captured during a time period before the radar frame. A motion vector is obtained representing a determined magnitude and direction of motion of the radar device at the time when the radar frame was captured. The motion of the radar device is due to an oscillatory movement of the radar device. A range Doppler representation of the radar frame is produced and a direction vector representing a direction from the radar device to the object is determined. A radial relative velocity between the object and the radar device is determined based on the obtained motion vector and the determined direction vector.

12 Claims, 6 Drawing Sheets

(58) Field of Classification Search
CPC . G01S 7/41; G01S 7/411; G01S 7/414; G01S 7/40; G01S 7/4004; G01S 13/931
See application file for complete search history.

(56) References Cited

U.S. PATENT DOCUMENTS

| | | | | |
|---|---|---|---|---|
| 11,467,254 | B2* | 10/2022 | Chen | G01S 7/418 |
| 11,579,282 | B2* | 2/2023 | Rao | G01S 13/931 |
| 12,111,392 | B2* | 10/2024 | Roger | G01S 7/356 |
| 2006/0028369 | A1* | 2/2006 | Rausch | G01S 13/888 |
| | | | | 342/107 |
| 2007/0132634 | A1* | 6/2007 | Wakeman | G01S 13/44 |
| | | | | 342/194 |
| 2011/0025545 | A1* | 2/2011 | Cook | G01S 13/5242 |
| | | | | 342/22 |
| 2021/0116536 | A1* | 4/2021 | Brosche | G01S 13/343 |
| 2021/0349179 | A1* | 11/2021 | Sakhnini | G01S 13/931 |
| 2023/0242133 | A1* | 8/2023 | Herman | G01S 7/4972 |
| | | | | 701/33.1 |
| 2023/0296758 | A1* | 9/2023 | Akbarzadeh | B60W 40/10 |
| | | | | 382/103 |
| 2024/0027608 | A1* | 1/2024 | Kesaraju | H04B 17/318 |

OTHER PUBLICATIONS

Longman, O. "Mitigation of vehicle vibration effect on automotive radar", Paper, IEEE Radar Conference, Israel (2019).
Hau, F. "The degradation of automotive radar sensor signals caused by vehicle vibrations and other nonlinear movements", Article, Mercedes-Benz Cars Development, Germany (2020).
Hau, F. "Influence of vibrations on the signals of automotive integrated radar sensors", Daimler Group Research and Advanced Engineering, Germany (2017).
Extended European Search Report issued on Mar. 29, 2023 for European Patent Application No. 22202515.7.

* cited by examiner

SYSTEMS AND METHOD FOR ADAPTIVE RADAR FRAME FILTERING

FIELD OF INVENTION

The present disclosure relates to processing of radar frames, and specifically to filtering out a representation of an object from a radar frame captured by a radar device.

TECHNICAL BACKGROUND

When a radar device is mounted on a stationary support and is used to monitor a scene, processing of each radar frame can be performed by which radar data relating to static objects, such as the ground, buildings, parked cars etc, may be removed from each radar frame. Such processing may be performed in applications when moving objects in the scene are of more interest than static objects. The processing is fairly straightforward when the radar device is firmly mounted on a stationary rigid support, such as a wall. However, if the radar device is mounted on a stationary non-rigid support, e.g., a non-rigid pole that can vibrate or sway back and forth, the radar device may thus move thereby causing a relative movement between the static objects and the moving radar device. Hence, in such a scenario radar data in relation to static objects may not be removed from the radar frames since the static objects do no longer appear as static due to the movement of the radar device.

Improvements in this context are thus desirable.

SUMMARY

In view of the above, it is an object of the present inventive concept to mitigate, alleviate or eliminate one or more of the above-identified deficiencies and disadvantages in the art singly or in combination.

According to a first aspect, a method for adaptively filtering out a representation of an object from a radar frame captured by a radar device is provided. A maximum signal strength at zero velocity is obtained in a range bin comprising a detection corresponding to the object in range Doppler representations of a set of radar frames captured by the radar device during a time period preceding the radar frame, which time period comprises at least one period of an oscillatory movement of the radar device in relation to stationary objects in a scene monitored by the radar device. A motion vector is obtained representing a determined magnitude and direction of motion of the radar device due to the oscillatory movement of the radar device. The radar frame captured by the radar device having the determined magnitude and direction of motion is received and a range Doppler representation of the radar frame is produced. A direction vector representing a direction from the radar device to the object is determined, and a radial relative velocity between the object and the radar device is determined based on the obtained motion vector and the determined direction vector. For the range bin in the range Doppler representation comprising the detection corresponding to the object, an interval is set around the determined radial relative velocity based on the determined radial relative velocity and the determined maximum signal strength. On condition that the detection is located within the set interval, a representation of the object from the radar frame is filtered out, and on condition that the detection is located outside the set interval, the detection corresponding to the object is not filtered out from the radar frame.

By determining the motion vector for the radar device at the time when the radar frame is captured by the radar device and determining the direction vector from the radar to the object, the radial relative velocity between the object and the radar device at the time when the radar frame is captured can be determined. The radial relative velocity is then used together with the maximum signal strength to determine an interval around the radial relative velocity in the range bin in the range Doppler representation of the radar frame, which range bin comprises the detection corresponding to the object. The interval is then used to determine whether a representation of the object is filtered out from the radar frame. By basing the interval on the determined radial relative velocity, static objects that due to the oscillatory movement of the radar device appear to have a velocity different from zero velocity in the range Doppler representation of the radar frame can be identified as static objects and/or representations of such objects can be filtered out from the radar frame.

Since the interval is based in part on the determined radial relative velocity at the time when the radar frame was captured, the filtering is more adaptive to the current radial relative velocity. If a general increase of the interval were to be used, there would be a higher risk that a slowly moving object would be filtered out from the radar frame.

In embodiments, the act of obtaining a maximum signal strength at zero velocity comprises receiving the set of radar frames captured by the radar device during a time period preceding the radar frame, which time period comprises at least one period of the oscillatory movement of the radar device in relation to stationary objects in a scene monitored by the radar device. Range Doppler representations are produced of the set of radar frames and a detection corresponding to the object is identified in each of the range Doppler representations of the set of radar frames. A signal strength at zero velocity is determined of the detection corresponding to the object in each range Doppler representation, and the maximum signal strength is determined as a maximum of the determined signal strengths.

According to a second aspect a method for adaptively filtering out a representation of an object from a first radar frame of a plurality of radar frames captured by a radar device is provided. For each radar frame of the plurality of radar frames a maximum signal strength at zero velocity in a range bin comprising the detection corresponding to the object is obtained in range Doppler representations of a set of radar frames captured by the radar device during a time period preceding the first radar frame, which time period comprises at least one period of an oscillatory movement of the radar device in relation to stationary objects in a scene monitored by the radar device. Furthermore, a motion vector is obtained representing a determined magnitude and direction of motion of the radar device due to the oscillatory movement of the radar device. Furthermore, the radar frame captured by the radar device having the determined magnitude and direction of motion is received and a range Doppler representation is produced of the radar frame. A direction vector representing a direction from the radar device to the detected object is determined, and a radial relative velocity between the object and the radar device is determined based on the determined motion vector and the determined direction vector. For the range bin in the range Doppler representation comprising the detection corresponding to the object, an interval around the determined radial relative velocity is set based on the determined radial relative velocity and the determined maximum signal strength. A common interval is then calculated as an average of the set intervals for the plurality of radar frames. On condition that the detection corresponding to the object is located within the calculated common interval in the range bin of the range Doppler representation of the first radar frame, the detection corresponding to the object is filtered out from the first radar frame. On condition that the detection corresponding to the object is located outside the calculated common interval in the range bin of the range Doppler representation of the first radar frame, the detection corresponding to the object is not filtered out from the first radar frame.

As described in relation to the method according to the first aspect, by the method according to the second aspect, static objects that due to the oscillatory movement of the radar device appear to have a velocity different from zero velocity in the range Doppler representation of the radar frame can be identified as static objects and/or representations of such objects can be filtered out from the radar frame.

Furthermore, by calculating a common interval as an average of the set intervals for the plurality of radar frames, robustness in relation to noise and errors can be increased.

In embodiments, the oscillatory movement of the radar device is due to an oscillatory movement of a support structure on which the radar device is mounted.

According to a third aspect, a non-transitory computer-readable storage medium is provided having stored thereon instructions for implementing the method according to the first aspect, or the method according to the second aspect, when executed by a device having processing capabilities.

According to a fourth aspect, a device for adaptively filtering out a representation of an object from a radar frame captured by a radar device is provided. The device comprises circuitry configured to execute a first obtaining function, a second obtaining function, a receiving function, a producing function, a first determining function, a second determining function, a setting function, and a filtering function. The first obtaining function is configured to obtain a maximum signal strength at zero velocity in a range bin comprising the detection corresponding to the object in range Doppler representations of a set of radar frames captured by the radar device during a time period preceding the radar frame, which time period comprises at least one period of an oscillatory movement of the radar device in relation to stationary objects in a scene monitored by the radar device. The second obtaining function is configured to obtain a motion vector representing a determined magnitude and direction of motion of the radar device due to the oscillatory movement of the radar device. The receiving function is configured to receive the radar frame captured by the radar device having the determined magnitude and direction of motion. The producing function is configured to produce a range Doppler representation of the radar frame. The first determining function is configured to determine a direction vector representing a direction from the radar device to the object. The second determining function is configured to determine a radial relative velocity between the object and the radar device based on the determined motion vector and the determined direction vector. The setting function is configured to, for the range bin in the range Doppler representation comprising the detection corresponding to the object, set an interval around the determined radial relative velocity based on the determined radial relative velocity and the determined maximum signal strength. The filtering function is configured to filter out a representation of the object from the first radar frame on condition that the detection corresponding to the object is located within the set interval, and to refrain from filtering out the representation of the object from the first radar frame on condition that the detection corresponding to the object is located outside the set interval.

The above-mentioned optional additional features of the method according to the first aspect, when applicable, apply to the device according to the fourth aspect as well. In order to avoid repetition, reference is made to the above.

According to a fifth aspect, a device for adaptively filtering out a representation of an object from a first radar frame of a plurality of radar frames captured by a radar device is provided. The device comprises circuitry configured to execute, for each radar frame of the plurality of radar frames, a first obtaining function, a second obtaining function, a receiving function, a producing function, a first determining function, a second determining function, and a setting function. The first obtaining function is configured to obtain a maximum signal strength at zero velocity in a range bin comprising the detection corresponding to the object in range Doppler representations of a set of radar frames captured by the radar device during a time period preceding the radar frame, which time period comprises at least one period of an oscillatory movement of the radar device in relation to stationary objects in a scene monitored by the radar device. The second obtaining function is configured to obtain a motion vector representing a determined magnitude and direction of motion of the radar device due to the oscillatory movement of the radar device. The receiving function is configured to receive the radar frame captured by the radar device having the determined magnitude and direction of motion. The producing function is configured to produce a range Doppler representation of the radar frame. The first determining function is configured to determine a direction vector representing a direction from the radar device to the object. The second determining function is configured to determine a radial relative velocity between the object and the radar device based on the determined motion vector and the determined direction vector. The setting function is configured to, for the range bin in the range Doppler representation comprising the detection corresponding to the object, set an interval around the determined radial relative velocity based on the determined radial relative velocity and the determined maximum signal strength. The circuitry is further configured to execute a calculating function and a filtering function. The calculating function is configured to calculate a common interval as an average of the set intervals for the plurality of radar frames. The filtering function is configured to filter out a representation of the object from the first radar frame on condition that the detection corresponding to the object is located within the common interval in the range bin of the range Doppler representation of the first radar frame, and to refrain from filtering out the representation of the object from the first radar frame on condition that the detection corresponding to the object is located outside the common interval in the range bin of the range Doppler representation of the first radar frame.

In embodiments, the oscillatory movement of the radar device is due to an oscillatory movement of a support structure on which the radar device is mounted.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF DRAWINGS

The above and other aspects of the present disclosure will now be described in more detail, with reference to appended figures. The figures should not be considered limiting but are instead used for explaining and understanding.

DETAILED DESCRIPTION

The present disclosure will now be described hereinafter with reference to the accompanying drawings, in which currently preferred embodiments of the disclosure are illustrated. This disclosure may, however, be embodied in many different forms and should not be construed as limited to the embodiments set forth herein.

The disclosure is applicable in scenarios where a radar device is stationary but not rigidly mounted such there may be a relative oscillation movement between static objects in a scene the radar device is monitoring and the radar device itself due to an oscillatory movement of the radar device in relation to stationary objects in a scene monitored by the radar device. This may for example occur when the radar device is mounted on a stationary non-rigid support, e.g., a non-rigid pole, that may oscillate back and forth. Such oscillation may for example occur due to wind or other physical impact to the non-rigid support.

The radar device is of a type that enables determining of a velocity of an object detected by the radar device. For example, the radar device may be a frequency modulated continuous wave (FMCW) radar device that uses short beat signals (chirps) for which the frequency varies over time, typically the frequency is ramped up or ramped down. As another example the radar device may be a phase modulated continuous wave (PMCW) radar device.

The radar device is further of a type that enables determining a direction vector from the radar device to an object detected by the radar device. For example, the radar device may be a multiple-input multiple output (MIMO) radar device.

Embodiments of a method 100 for adaptively filtering out a representation of an object from a radar frame captured by a radar device will now be described in relation to the flow charts in FIG. 1A and FIG. 1B. The method 100 relates to adaptive filtering in relation to one object. However, the principles of the method can be used for adaptive filtering in relation to all objects of a radar frame either in sequence or in parallel.

The method 100 comprises obtaining S110 a maximum signal strength at zero velocity in a range bin comprising a detection corresponding to the object in range Doppler representations of a set of radar frames captured by the radar device. Signal strength here relates to the signal strength of the reflected signal received at the radar device. The set of radar frames are captured during a time period preceding the radar frame, i.e., preceding the time the radar frame is captured. Furthermore, the time period is made sufficiently long to comprise at least one period of the oscillatory movement of the radar device. This is to ensure that the maximum signal strength of the detection corresponding to the object will be at, or at least close to, zero velocity in the range Doppler representation of at least one radar frame of the set of radar frames. For example, if the period of the oscillatory movement is 2 seconds and there are 10 radar frames per second, the set of radar frames should comprise at least 20 radar frames.

For a FMCW radar device, a range Doppler representation may be produced by logically arranging analog-to-digital converted data corresponding to downconverted chirps as columns of a matrix. An FFT in each column resolves objects in range from the radar device such that each row is a range bin including detections of objects within a range interval from the radar device. An FFT along a row on the other hand resolves each row (range bin) in velocity in relation to the radar device such that each column includes detections of objects within a velocity interval in relation to the radar device. The range Doppler representation includes detections, which detections' position in relation to a vertical y-axis correspond to objects in the scene at different ranges from the radar device. The detections' positions in relation to a horizontal x-axis corresponds to the radial velocity between the radar device and the object.

As indicated hereinabove, the method 100 is described in relation to one object. Generally, the filtering can be performed in relation to all objects in the radar frame. The maximum signal strength at zero velocity in each range bin over the set of radar frames may then be obtained. The remaining steps S120-S194 of the method 100 is then performed for each range bin in the radar frame based on the respective maximum signal strength. To reduce the number of range bins for which the method 100 is performed, it may be limited to range bins that include objects that are likely to be static. This can be achieved by identifying all range bins having a maximum signal strength at zero velocity that is over a threshold indicating a detection corresponding to an object. The remaining steps of the method 100 is then performed only for the identified range bins in the radar frame.

The act of obtaining S110 a maximum signal strength at zero velocity may comprise receiving the set of radar frames captured by the radar device during the time period preceding the radar frame. Range Doppler representations are then produced of the set of radar frames. A signal strength at zero velocity is then determined in the range bin comprising the detection corresponding to the object in each range Doppler representation, and the maximum signal strength is determined as a maximum of the determined signal strengths.

The method further comprises obtaining S120 a motion vector representing a determined magnitude and direction of motion of the radar device in relation to stationary objects in a scene monitored by the radar device. The relative movement between the radar device and stationary objects in the scene is due to the oscillatory movement of the radar device. Furthermore, as the movement of the radar device is oscillatory, the magnitude and direction of motion of the radar device will vary over time. To this end, the magnitude and direction of motion is determined at the time when the radar frame is captured by the radar device. The motion vector can be obtained by means of receiving measurements by an accelerometer arranged in the radar device, which measurements were made at the time of capturing the radar frame. In alternative the motion vector can be obtained by determining the relative velocity in relation to a set of objects in the scene which have been identified as being static in the scene and which have known locations in relation to the radar device.

The method 100 further comprises receiving S130 the radar frame captured by the radar device and producing S140 a range Doppler representation of the radar frame. As indicated hereinabove, the radar device had the determined magnitude and direction of movement at the time when the radar frame was captured. As indicated hereinabove, the range Doppler representation includes detections, which detections' position in relation to a vertical y-axis correspond to objects in the scene at different ranges from the radar device. The detections' positions in relation to a horizontal x-axis corresponds to the radial velocity between the radar device and the object. Due to the oscillatory movement, the radar device has a determined magnitude and direction of motion in relation to stationary objects when the radar frame is captured. Hence, detections corresponding to static objects in the scene will not be located at a location in the range Doppler representation corresponding to zero velocity.

The method 100 further comprises determining S150 a direction vector representing a direction from the radar device to the object, and determining S160 a radial relative velocity between the object and the radar device based on the obtained motion vector and the determined direction vector. The radar device may be a MIMO radar device. The radar device may further be a FMCW radar device or a PMCW radar device.

For the range bin in the range Doppler representation comprising the detection corresponding to the object, an interval is set S170 around the determined radial relative velocity. The interval is set in relation to the radar frame and is based on the determined radial relative velocity which is specific to the radar frame and the determined maximum signal strength. The interval is used to determine whether a representation of the object should be filtered out from the radar frame. Specifically, on condition C190 that the detection is located within the set interval, a representation of the object is filtered out S192 from the radar frame, and on condition C190 that the detection is located outside the set interval, the representation of the object is not filtered out S194 from the radar frame. By a detection being located within the set interval is meant that any energy outside the interval will be below a threshold for what is considered to be a detection. By the detection being located outside the set interval is meant that energy outside the interval is above the threshold for what is considered to be a detection.

By the interval being set around the determined radial relative velocity is meant that the interval starts below the determined radial relative velocity and ends above the determined radial relative velocity. For example, the interval may be symmetrical around the determined radial relative velocity, i.e., such that the determined radial relative velocity is in the middle of the interval.

The set interval around the determined radial relative velocity is used instead of a fixed guard interval around zero velocity set for all radar frames in prior art. The interval is set based in part on the determined radial relative velocity which is determined based on the determined magnitude and direction of movement of the radar device at the time the radar frame was captured. Hence, the set interval for the radar frame is adapted to the determined magnitude and direction of movement of the radar device at the time the radar frame was captured. By setting the interval adaptively taking into account the determined maximum signal strength and the determined relative radial velocity, the filtering will be adapted such that the representation of the object will be filtered out from the radar frame even if the detection in the range bin would not have been considered to correspond to a static object if the prior art methods using a fixed guard interval would have been used. For example, the larger the radial relative velocity is, the larger the interval may be set.

Figure 2A:
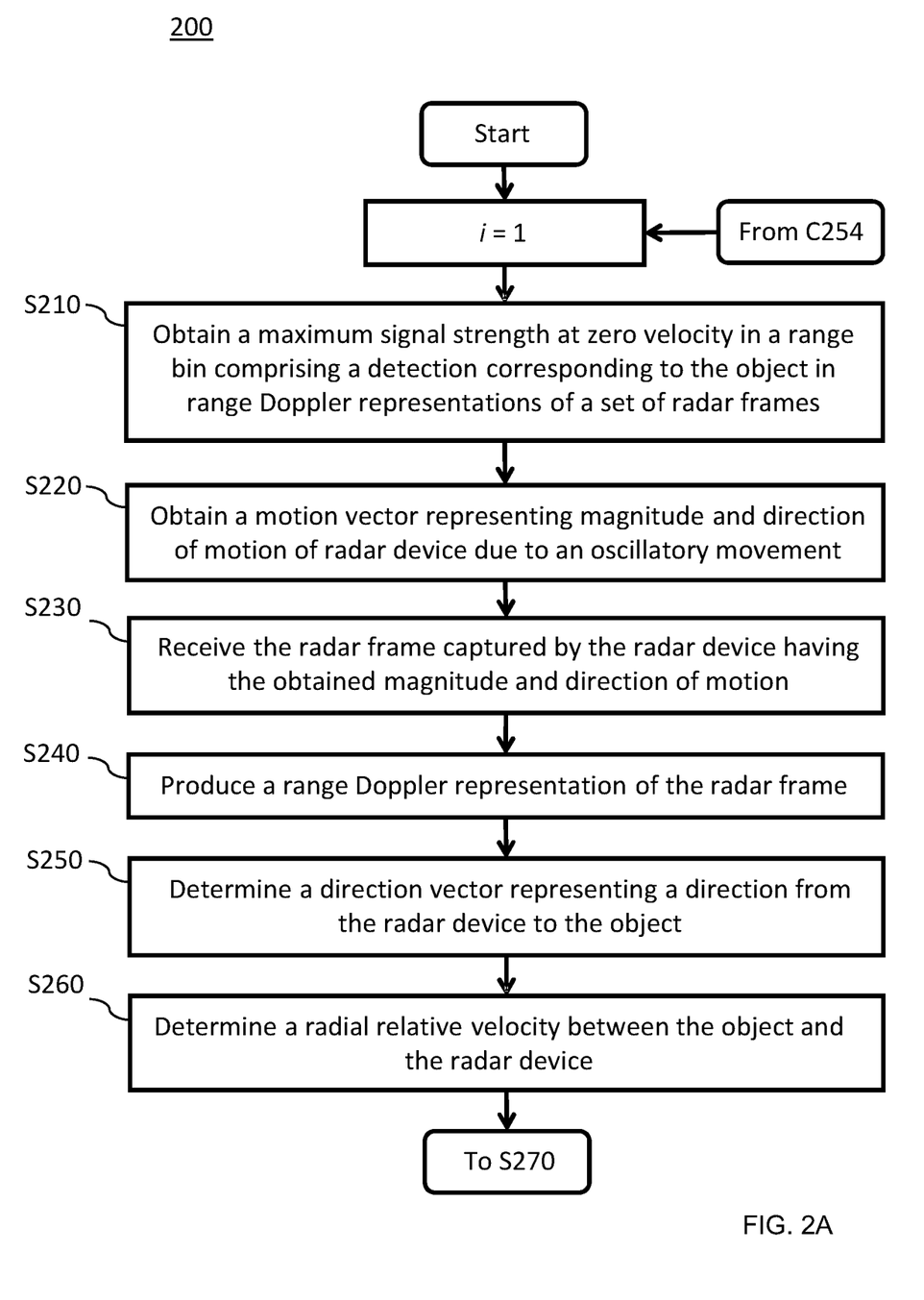
FIG. 2A and FIG. 2B show flow charts in relation to embodiments of a method for adaptively filtering out a representation of an object from a first radar frame of a plurality of radar frames captured by a radar device.
Figure 2B:
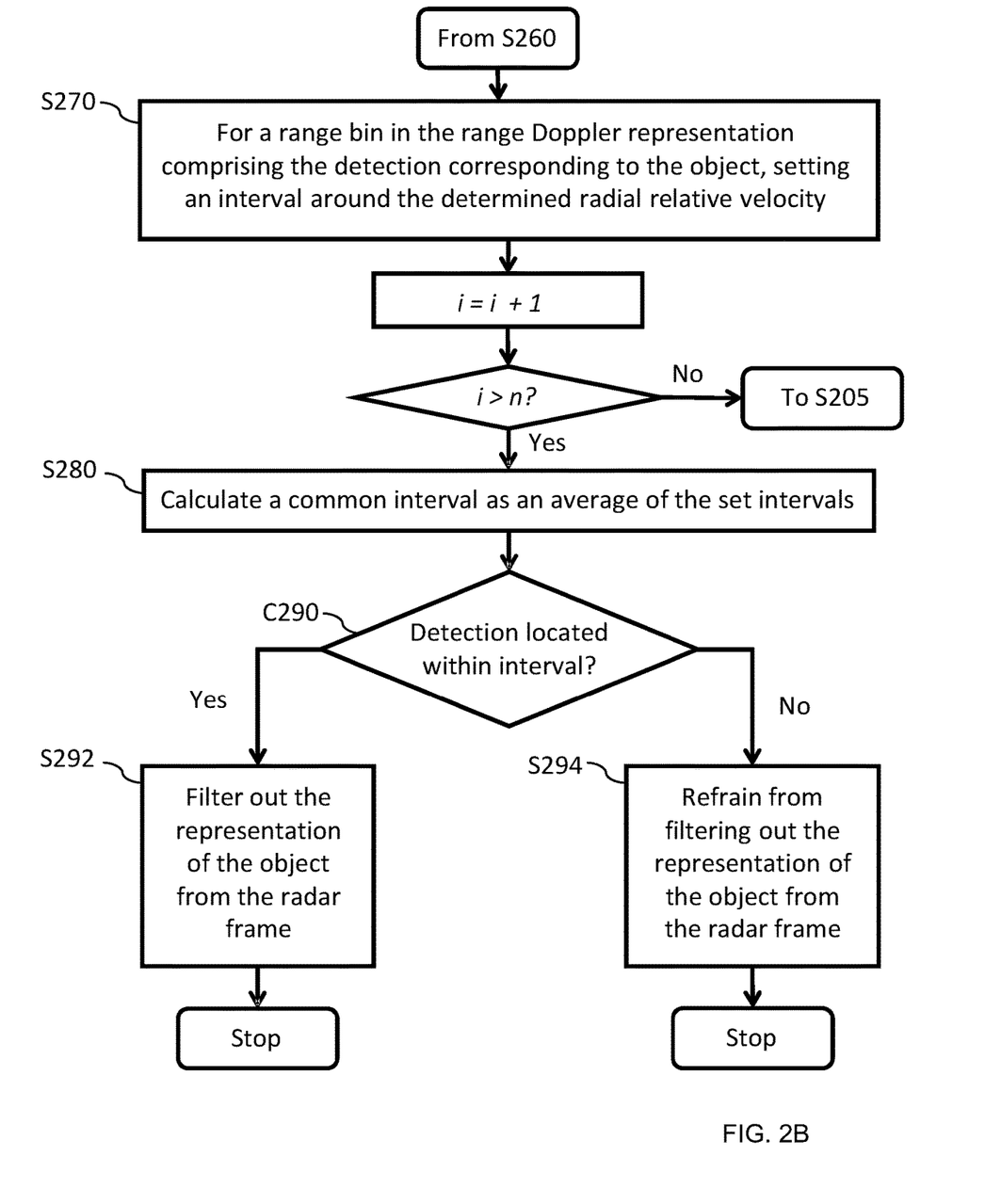

FIG. 2A and FIG. 2B show flow charts in relation to embodiments of a method for adaptively filtering out a representation of an object from a first radar frame of a plurality of radar frames captured by a radar device.

In the method 200, the acts of obtaining S210 a maximum signal strength, obtaining S220 a motion vector, receiving S230 the radar frame, producing S240 a range doppler representation, determining S250 a direction vector, determining S260 a radial relative velocity, and setting S270 an interval are performed for each radar frame i of a plurality of radar frames consisting of n radar frames. For details and options of these acts S210-S270, reference is made to the details and options for the corresponding acts S110-S170 of the method 100 described in relation to FIG. 1A and FIG. 1B.

One interval for the range bin is thus set in relation to each radar frame. A common interval for the range bin is then calculated S280 as an average of the set intervals for the plurality of radar frames. The common interval is then used to determine whether a representation of the object should be filtered out from the first radar frame. The common interval is located around the radial relative velocity as determined at the time when the first radar frame was captured by the radar device. Specifically, on condition C290 that the detection is located within the common interval, a representation of the object is filtered out S292 from the radar frame, and on condition C290 that the detection is located outside the common interval, the representation of the object is not filtered out S194 from the radar frame.

Figure 1A:
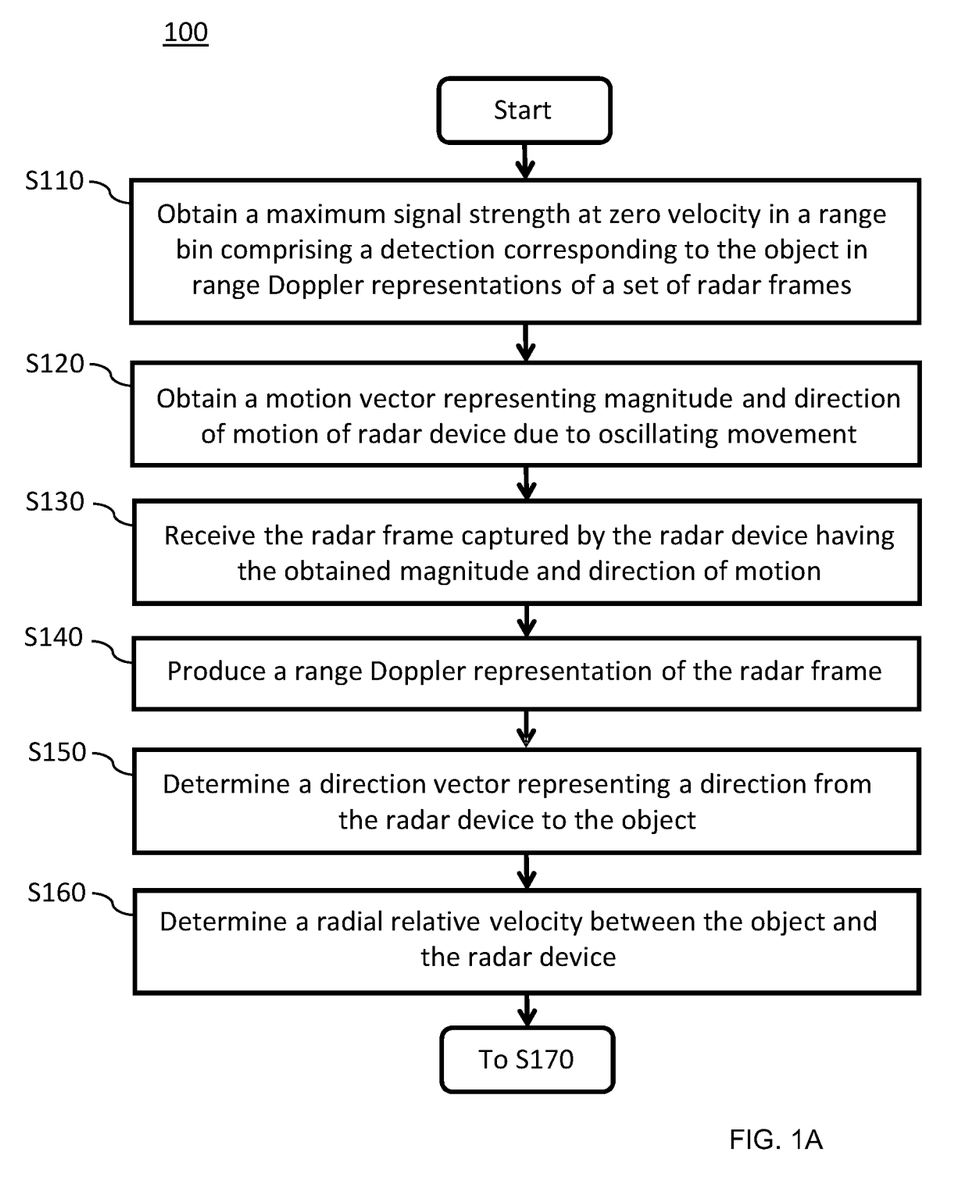
FIG. 1A and FIG. 1B show flow charts in relation to embodiments of a method for adaptively filtering out a representation of an object from a radar frame captured by a radar device.
Figure 1B:
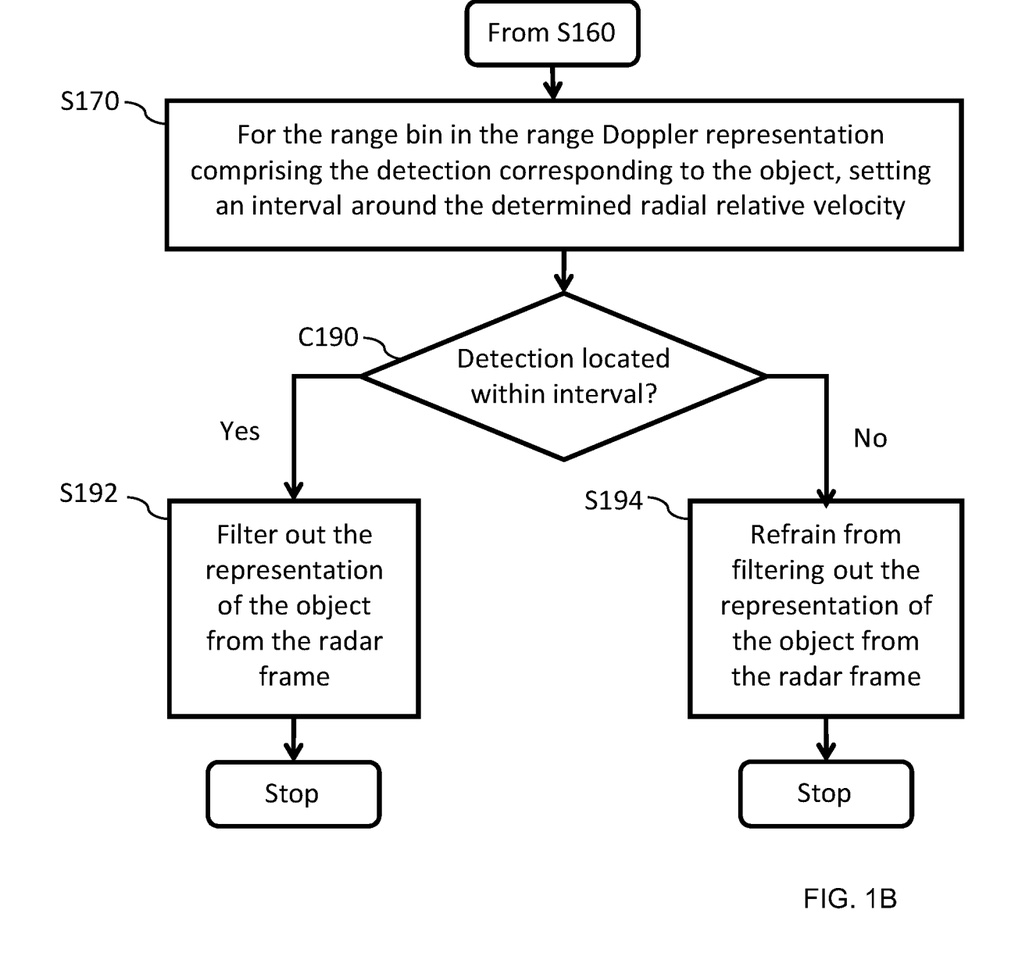

For further details and options for the act of filtering S290-S294 of the method 200 reference is made to the details and options for the acts of the corresponding act S190-S194 of the method 100 described in relation to FIG. 1A and FIG. 1B.

Figure 3:
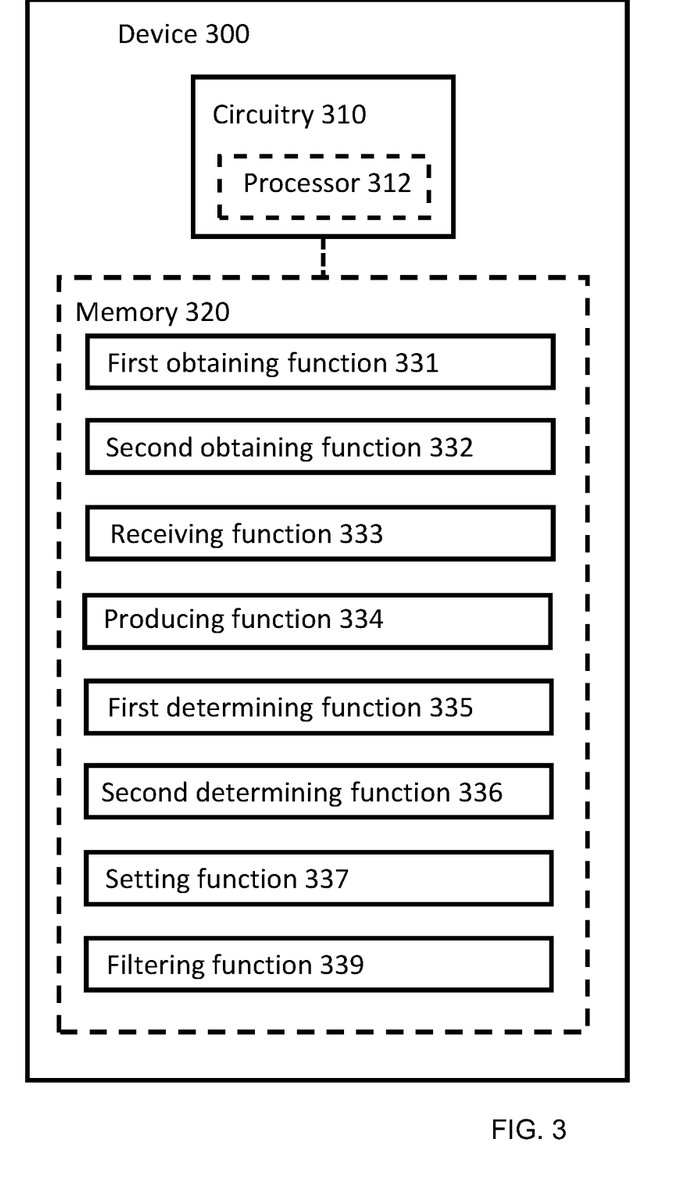
FIG. 3 shows a block diagram in relation to embodiments of a device for adaptively filtering out a representation of an object from a radar frame captured by a radar device.

FIG. 3 shows a block diagram in relation to embodiments of a device 300 for adaptively filtering out a representation of an object from a radar frame captured by a radar device.

The device 300 comprises a circuitry 310. The circuitry 310 is configured to carry out functions of the device 300. The circuitry 310 may include a processor 312, such as for example a central processing unit (CPU), graphical processing unit (GPU), tensor processing unit (TPU), microcontroller, or microprocessor. The processor 312 is configured to execute program code. The program code may for example be configured to carry out the functions of the device 300.

The device 300 may further comprise a memory 320. The memory 320 may be one or more of a buffer, a flash memory, a hard drive, a removable media, a volatile memory, a non-volatile memory, a random access memory (RAM), or another suitable device. In a typical arrangement, the memory 320 may include a non-volatile memory for long term data storage and a volatile memory that functions as device memory for the circuitry 310. The memory 320 may exchange data with the circuitry 310 over a data bus. Accompanying control lines and an address bus between the memory 320 and the circuitry 310 also may be present.

Functions of the device 300 may be embodied in the form of executable logic routines (e.g., lines of code, software programs, etc.) that are stored on a non-transitory computer readable medium (e.g., the memory 320) of the device 300 and are executed by the circuitry 310 (e.g., using the processor 312). Furthermore, the functions of the device 300 may be a stand-alone software application or form a part of a software application that carries out additional tasks related to the device 300. The described functions may be considered a method that a processing unit, e.g., the processor 312 of the circuitry 310 is configured to carry out. Also, while the described functions may be implemented in software, such functionality may as well be carried out via dedicated hardware or firmware, or some combination of hardware, firmware and/or software.

The circuitry 310 is configured to execute a first obtaining function 331, a second obtaining function 332, a receiving function 333, a producing function 334, a first determining function 335, a second determining function 336, a setting function 337 and a filtering function 339.

The first obtaining function 331 is configured to obtain a maximum signal strength at zero velocity in a range bin comprising the detection corresponding to the object in range Doppler representations of a set of radar frames captured by the radar device during a time period preceding the radar frame, which time period comprises at least one period of an oscillatory movement of the radar device in relation to stationary objects in a scene monitored by the radar device. The second obtaining function 332 is configured to obtain a motion vector representing a determined magnitude and direction of motion of the radar device due to the oscillatory movement of the radar device. The receiving function 333 is configured to receive the radar frame captured by the radar device having the determined magnitude and direction of motion. The producing function 334 is configured to produce a range Doppler representation of the radar frame. The first determining function 335 is configured to determine a direction vector representing a direction from the radar device to the object. The second determining function 336 is configured to determine a radial relative velocity between the object and the radar device based on the determined motion vector and the determined direction vector. The setting function 337 is configured to, for the range bin in the range Doppler representation comprising the detection corresponding to the object, set an interval around the determined radial relative velocity based on the determined radial relative velocity and the determined maximum signal strength. The filtering function 339 is configured to filter out a representation of the object from the first radar frame on condition that the detection corresponding to the object is located within the set interval, and to refrain from filtering out the representation of the object from the first radar frame on condition that the detection corresponding to the object is located outside the set interval.

For further details and options for the functions of the device 300 reference is made to the details and options for the acts of the method 100 described in relation to FIG. 1A and FIG. 1B.

Figure 4:
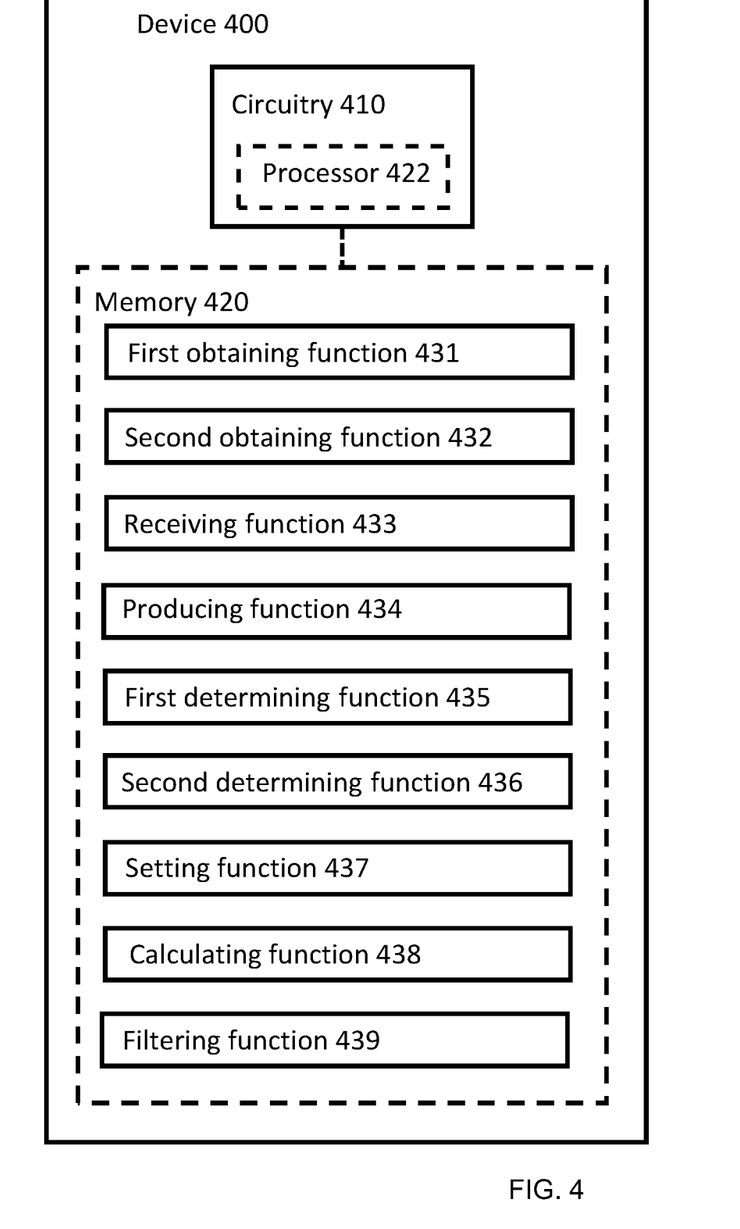
FIG. 4 shows a block diagram in relation to embodiments of a device for adaptively filtering out a representation of an object from a first radar frame of a plurality of radar frames captured by a radar device.

FIG. 4 shows a block diagram in relation to embodiments of a device 400 for adaptively filtering out a representation of an object from a first radar frame of a plurality of radar frames captured by a radar device.

The device 400 comprises a circuitry 410. The circuitry 410 is configured to carry out functions of the device 400. The circuitry 410 may include a processor 412, such as for example a central processing unit (CPU), graphical processing unit (GPU), tensor processing unit (TPU), microcontroller, or microprocessor. The processor 112 is configured to execute program code. The program code may for example be configured to carry out the functions of the device 400.

The device 400 may further comprise a memory 420. The memory 420 may be one or more of a buffer, a flash memory, a hard drive, a removable media, a volatile memory, a non-volatile memory, a random access memory (RAM), or another suitable device. In a typical arrangement, the memory 420 may include a non-volatile memory for long term data storage and a volatile memory that functions as device memory for the circuitry 410. The memory 420 may exchange data with the circuitry 410 over a data bus. Accompanying control lines and an address bus between the memory 420 and the circuitry 410 also may be present.

Functions of the device 400 may be embodied in the form of executable logic routines (e.g., lines of code, software programs, etc.) that are stored on a non-transitory computer readable medium (e.g., the memory 420) of the device 400 and are executed by the circuitry 410 (e.g., using the processor 412). Furthermore, the functions of the device 400 may be a stand-alone software application or form a part of a software application that carries out additional tasks related to the device 400. The described functions may be considered a method that a processing unit, e.g., the processor 412 of the circuitry 410 is configured to carry out. Also, while the described functions may be implemented in software, such functionality may as well be carried out via dedicated hardware or firmware, or some combination of hardware, firmware and/or software.

The circuitry 410 is configured to execute, for each radar frame of the plurality of radar frames, a first obtaining function 431, a second obtaining function 432, a receiving function 433, a producing function 434, a first determining function 435, a second determining function 436. The circuitry 410 is further configured to execute a calculating function 438 and a filtering function 439.

The first obtaining function 431 is configured to obtain a maximum signal strength at zero velocity in a range bin comprising the detection corresponding to the object in range Doppler representations of a set of radar frames captured by the radar device during a time period preceding the radar frame, which time period comprises at least one period of an oscillatory movement of the radar device in relation to stationary objects in a scene monitored by the radar device. The second obtaining function 432 is configured to obtain a motion vector representing a determined magnitude and direction of motion of the radar device due to the oscillatory movement of the radar device. The receiving function 433 is configured to receive the radar frame captured by the radar device having the determined magnitude and direction of motion. The producing function 434 is configured to produce a range Doppler representation of the radar frame. The first determining function 435 is configured to determine a direction vector representing a direction from the radar device to the object. The second determining function 436 is configured to determine a radial relative velocity between the object and the radar device based on the determined motion vector and the determined direction vector. The setting function 437 is configured to, for the range bin in the range Doppler representation comprising the detection corresponding to the object, set an interval around the determined radial relative velocity based on the determined radial relative velocity and the determined maximum signal strength. The circuitry is further configured to execute a calculating function 438 and a filtering function 439. The calculating function 438 is configured to calculate a common interval as an average of the set intervals for the plurality of radar frames. The filtering function 439 is configured to filter out a representation of the object from the first radar frame on condition that the detection corresponding to the object is located within the common interval in the range bin of the range Doppler representation of the first radar frame, and to refrain from filtering out the representation of the object from the first radar frame on condition that the detection corresponding to the object is located outside the common interval in the range bin of the range Doppler representation of the first radar frame.

For further details and options for the functions of the device 400 reference is made to the details and options for the corresponding acts of the method 100 described in relation to FIG. 1A and FIG. 1B and of the method 200 described in relation to FIG. 2A and FIG. 2B.

A person skilled in the art realizes that the present disclosure is not limited to the embodiments described above. On the contrary, many modifications and variations are possible within the scope of the appended claims. Such modifications and variations can be understood and effected by a skilled person in practicing the claimed disclosure, from a study of the drawings, the disclosure, and the appended claims.

The invention claimed is:

1. A method for adaptively filtering out a representation of an object from a radar frame captured by a radar device, the method comprising:
   obtaining a maximum signal strength at zero velocity in a range bin comprising a detection corresponding to the object in range Doppler representations of a set of radar frames captured by the radar device during a time period preceding the radar frame, which time period comprises at least one period of an oscillatory movement of the radar device in relation to stationary objects in a scene monitored by the radar device;
   obtaining a motion vector representing a determined magnitude and direction of motion of the radar device due to the oscillatory movement of the radar device;
   receiving the radar frame captured by the radar device having the obtained magnitude and direction of motion;
   producing a range Doppler representation of the radar frame;
   determining a direction vector representing a direction from the radar device to the object;
   determining a radial relative velocity between the object and the radar device based on the obtained motion vector and the determined direction vector;
   for the range bin in the range Doppler representation comprising the detection corresponding to the object, setting an interval around the determined radial relative velocity of the object based on the determined radial relative velocity and the determined maximum signal strength;
   on condition that the detection corresponding to the object is located within the set interval, filtering out a representation of the object from the radar frame; and
   on condition that the detection corresponding to the object is located outside the set interval, refraining from filtering out the representation of the object from the radar frame.

2. The method of claim 1, wherein the act of obtaining a maximum signal strength at zero velocity comprises:
   receiving a set of radar frames captured by the radar device during a time period preceding the radar frame, which time period comprises at least one period of the oscillatory movement of the radar device in relation to stationary objects in a scene monitored by the radar device;
   producing range Doppler representations of the set of radar frames;
   determining a signal strength at zero velocity in the range bin comprising the detection corresponding to the object in each range Doppler representation; and
   determining the maximum signal strength as a maximum of the determined signal strengths.

3. The method of claim 1, wherein the oscillatory movement of the radar device is due to an oscillatory movement of a support structure on which the radar device is mounted.

4. A method for adaptively filtering out a representation of an object from a first radar frame of a plurality of radar frames captured by a radar device, the method comprising:
   for each radar frame of the plurality of radar frames:
      obtaining a maximum signal strength at zero velocity in a range bin comprising a detection corresponding to the object in range Doppler representations of a set of radar frames captured by the radar device during a time period preceding the first radar frame, which time period comprises at least one period of an oscillatory movement of the radar device in relation to stationary objects in a scene monitored by the radar device;
      obtaining a motion vector representing a determined magnitude and direction of motion of the radar device due to the oscillatory movement of the radar device;
      receiving the radar frame captured by the radar device having the determined magnitude and direction of motion;
      producing a range Doppler representation of the radar frame;
      determining a direction vector representing a direction from the radar device to the detected object;
      determining a radial relative velocity between the object and the radar device based on the determined motion vector and the determined direction vector; and
      for the range bin in the range Doppler representation comprising the detection corresponding to the object, setting an interval around the determined radial relative velocity of the object based on the determined radial relative velocity and the determined maximum signal strength;
   calculating a common interval as an average of the set intervals for the plurality of radar frames;
   on condition that the detection corresponding to the object is located within the calculated common interval in the range bin of the range Doppler representation of the first radar frame, filtering out a representation of the object from the first radar frame; and on condition that the detection corresponding to the object is located outside the calculated common interval in the range bin of the range Doppler representation of the first radar frame, refraining from filtering out the representation of the object from the first radar frame.

5. The method of claim 4, wherein the oscillatory movement of the radar device is due to an oscillatory movement of a support structure on which the radar device is mounted.

6. A non-transitory computer-readable storage medium having stored thereon instructions for implementing a method for adaptively filtering out a representation of an object from a radar frame captured by a radar device, the method comprising:

obtaining a maximum signal strength at zero velocity in a range bin comprising a detection corresponding to the object in range Doppler representations of a set of radar frames captured by the radar device during a time period preceding the radar frame, which time period comprises at least one period of an oscillatory movement of the radar device in relation to stationary objects in a scene monitored by the radar device;

obtaining a motion vector representing a determined magnitude and direction of motion of the radar device due to the oscillatory movement of the radar device;

receiving the radar frame captured by the radar device having the obtained magnitude and direction of motion;

producing a range Doppler representation of the radar frame;

determining a direction vector representing a direction from the radar device to the object;

determining a radial relative velocity between the object and the radar device based on the obtained motion vector and the determined direction vector;

for the range bin in the range Doppler representation comprising the detection corresponding to the object, setting an interval around the determined radial relative velocity of the object based on the determined radial relative velocity and the determined maximum signal strength;

on condition that the detection corresponding to the object is located within the set interval, filtering out a representation of the object from the radar frame; and on condition that the detection corresponding to the object is located outside the set interval, refraining from filtering out the representation of the object from the radar frame.

7. A non-transitory computer-readable storage medium having stored thereon instructions for implementing a method for adaptively filtering out a representation of an object from a first radar frame of a plurality of radar frames captured by a radar device, the method comprising:

for each radar frame of the plurality of radar frames:
obtaining a maximum signal strength at zero velocity in a range bin comprising a detection corresponding to the object in range Doppler representations of a set of radar frames captured by the radar device during a time period preceding the first radar frame, which time period comprises at least one period of an oscillatory movement of the radar device in relation to stationary objects in a scene monitored by the radar device;

obtaining a motion vector representing a determined magnitude and direction of motion of the radar device due to the oscillatory movement of the radar device;

receiving the radar frame captured by the radar device having the determined magnitude and direction of motion;

producing a range Doppler representation of the radar frame;

determining a direction vector representing a direction from the radar device to the detected object;

determining a radial relative velocity between the object and the radar device based on the determined motion vector and the determined direction vector; and for the range bin in the range Doppler representation comprising the detection corresponding to the object, setting an interval around the determined radial relative velocity of the object based on the determined radial relative velocity and the determined maximum signal strength;

calculating a common interval as an average of the set intervals for the plurality of radar frames;

on condition that the detection corresponding to the object is located within the calculated common interval in the range bin of the range Doppler representation of the first radar frame, filtering out a representation of the object from the first radar frame; and on condition that the detection corresponding to the object is located outside the calculated common interval in the range bin of the range Doppler representation of the first radar frame, refraining from filtering out the representation of the object from the first radar frame.

8. A device for adaptively filtering out a representation of an object from a radar frame captured by a radar device, the device comprising circuitry configured to execute:

a first obtaining function configured to obtain a maximum signal strength at zero velocity in a range bin comprising a detection corresponding to the object in range Doppler representations of a set of radar frames captured by the radar device during a time period preceding the radar frame, which time period comprises at least one period of an oscillatory movement of the radar device in relation to stationary objects in a scene monitored by the radar device;

a second obtaining function configured to obtain a motion vector representing a determined magnitude and direction of motion of the radar device due to an oscillatory movement of the radar device;

a receiving function configured to receive the radar frame captured by the radar device having the determined magnitude and direction of motion;

a producing function configured to produce a range Doppler representation of the radar frame;

a first determining function configured to determine a direction vector representing a direction from the radar device to the object;

a second determining function configured to determine a radial relative velocity between the object and the radar device based on the obtained motion vector and the determined direction vector;

a setting function configured to, for the range bin in the range Doppler representation comprising the detection corresponding to the object, set an interval around the determined radial relative velocity of the object based on the determined radial relative velocity and the determined maximum signal strength;

a filtering function configured to:

on condition that the detection corresponding to the object is located within the set interval, filtering out a representation of the object from the radar frame; and on condition that the detection corresponding to the object is located outside the set interval, refraining from filtering out the representation of the object from the radar frame.

9. The device of claim 8, wherein the first obtaining function is configured to:

receive a set of radar frames captured by the radar device during a time period preceding the radar frame, which time period comprises at least one period of the oscillatory movement of the radar device in relation to stationary objects in a scene monitored by the radar device, produce range Doppler representations of the set of radar frames;

determine a signal strength at zero velocity in the range bin comprising the detection corresponding to the object in each range Doppler representation, and determine the maximum signal strength as a maximum of the determined signal strengths.

10. The device of claim 8, wherein the oscillatory movement of the radar device is due to an oscillatory movement of a support structure on which the radar device is mounted.

11. A device for adaptively filtering out a representation of an object from a first radar frame of a plurality of radar frames captured by a radar device, the device comprising circuitry configured to execute:

for each radar frame of the plurality of radar frames:

a first obtaining function configured to obtain a maximum signal strength at zero velocity in a range bin comprising a detection corresponding to the object in range Doppler representations of a set of radar frames captured by the radar device during a time period preceding the first radar frame, which time period comprises at least one period of an oscillatory movement of the radar device in relation to stationary objects in a scene monitored by the radar device;

a second obtaining function configured to obtain receive a motion vector representing a determined magnitude and direction of motion of the radar device due to an oscillatory movement of the radar device;

a receiving function configured to receive the radar frame captured by the radar device having the determined magnitude and direction of motion;

a producing function configured to produce a range Doppler representation of the radar frame;

a first determining function configured to determine a direction vector representing a direction from the radar device to the detected object;

a second determining function configured to determine a radial relative velocity between the object and the radar device based on the determined motion vector and the determined direction vector; and a setting function configured to, for the range bin in the range Doppler representation comprising the detection comprising the object, set an interval around the determined radial relative velocity of the object based on the determined radial relative velocity and the determined maximum signal strength;

wherein the circuitry is further configured to execute:

a calculating function configured to calculate a common interval as an average of the set intervals for the plurality of radar frames; and a filtering function configured to:

on condition that the detection corresponding to the object is located within the calculated common interval in the range bin of the range Doppler representation of the first radar, filtering out a representation of the object from the first radar frame; and on condition that the detection corresponding to the object is located outside the calculated common interval in the range bin of the range Doppler representation of the first radar, refraining from filtering out the representation of object from the first radar frame.

12. The device of claim 11, wherein the oscillatory movement of the radar device is due to an oscillatory movement of a support structure on which the radar device is mounted.

* * * * *